United States Patent
Leduc

(10) Patent No.: US 7,925,734 B2
(45) Date of Patent: Apr. 12, 2011

(54) METHOD FOR ROUTING USER INPUTS BETWEEN APPLICATIONS

(75) Inventor: Sylvain Leduc, Galineau (CA)

(73) Assignee: Mitel Networks Corporation, Ottawa, Ontario (CA)

( * ) Notice: Subject to any disclaimer, the term of this patent is extended or adjusted under 35 U.S.C. 154(b) by 7 days.

(21) Appl. No.: 12/006,608

(22) Filed: Jan. 4, 2008

(65) Prior Publication Data

US 2009/0177795 A1   Jul. 9, 2009

(51) Int. Cl.
*G06F 15/173* (2006.01)
*G06F 15/177* (2006.01)
*G06F 15/16* (2006.01)

(52) U.S. Cl. .................... 709/223; 709/217; 709/220

(58) Field of Classification Search .......... 709/216–220, 709/223, 225, 229
See application file for complete search history.

(56) References Cited

U.S. PATENT DOCUMENTS

| 5,631,954 | A | 5/1997 | Evans | |
| 6,327,579 | B1 * | 12/2001 | Crawford | 705/400 |
| 6,959,380 | B2 * | 10/2005 | Dake et al. | 713/2 |
| 7,212,629 | B2 | 5/2007 | Lennon | |
| 2002/0154161 | A1 * | 10/2002 | Friedman et al. | 345/740 |
| 2005/0097570 | A1 * | 5/2005 | Bomers | 719/318 |

FOREIGN PATENT DOCUMENTS

WO   WO 2005081140 A2 *   9/2005

* cited by examiner

*Primary Examiner* — Yemane Mesfin

(57) ABSTRACT

A method is set forth for routing user inputs from a PC to at least one embedded system over a network, comprising configuring at least one hotkey combination within the PC that maps to the at least one embedded system, upon receipt of the at least one hotkey combination capturing user interface input events to the PC and transmitting the user interface input events over the network to the at least one embedded system, and within the at least one embedded system injecting the user interface input events into an RTOS/Graphic engine.

12 Claims, 4 Drawing Sheets

METHOD FOR ROUTING USER INPUTS BETWEEN APPLICATIONS

FIELD

This specification relates in general to computer systems, and more particularly to a method for routing user inputs from a first to one or more additional applications.

BACKGROUND

An embedded system is a special-purpose computer system designed to perform one or a few dedicated functions. It is usually embedded as part of a complete device including hardware and mechanical parts. In contrast, a general-purpose computer, such as a personal computer (PC), can do many different tasks depending on programming. Embedded systems have become very important today as they control many common devices in everyday use.

It is known in the art to provide user interfaces to many types of embedded systems, such as IP phones, personal digital assistants (PDAs), etc. For example, large graphic displays may be provided with large numbers of hardware buttons for accessing data and features on an IP phone. However, traditional user interfaces to such embedded systems, such as softkeys, buttons, touch screens, trackballs, etc., are often inadequate for invoking applications/functionality and capturing/accessing data. For example, large numbers of hardware buttons mapped to given areas of a display are costly, give rise to industrial design challenges, and are not well suited to capturing text. Touch screens are also expensive and prone to failure.

Products are also known in the art for controlling PCs from a remote location, such as Windows Remote Desktop and VNC. Such products locally construct a representation of a remote target, which requires a tremendous amount of information to be transmitted, and demand significant processing power to generate a virtual representation for interfacing with the remote target.

Furthermore, it is also known in the art to connect PC input devices (such as keyboards and mice) to embedded systems (such as IP phones). For example, U.S. Pat. No. 7,212,629 describes the coupling of a computer mouse directly to a phone for control of features, and U.S. Pat. No. 5,631,954 describes connecting a keyboard to an IP phone. In these prior art arrangements, the design of the PC input devices is customized for connection to the IP phone. The input device stimuli are mapped to functionality that is transmitted across various different types of networks (i.e. Ethernet, analog, etc.), rather than simply transmitting the actual device stimuli.

SUMMARY

According to an aspect of this specification, a method is described for routing PC input device signals across a network (e.g. LAN) from one application to another application hosted on an embedded system (e.g. PDA, IP phone, cell phone, etc.) In contrast with U.S. Pat. No. 7,212,629 and U.S. Pat. No. 5,631,954, the PC input device stimuli are transmitted between the systems rather than the actual functionality. Also, the PC input devices may be off-the-shelf components. There is no need to customize or modify the devices to control the embedded system. Moreover, there is no requirement for physical interfaces between the PC input devices and the embedded system. Thus, a single PC keyboard or computer mouse, for example, may be used to control a plurality of embedded systems, either at the same time or individually.

These together with other aspects and advantages which will be subsequently apparent, reside in the details of construction and operation as more fully hereinafter described and claimed, reference being had to the accompanying drawings forming a part hereof, wherein like numerals refer to like parts throughout.

DETAILED DESCRIPTION OF THE PREFERRED EMBODIMENTS

Figure 1:
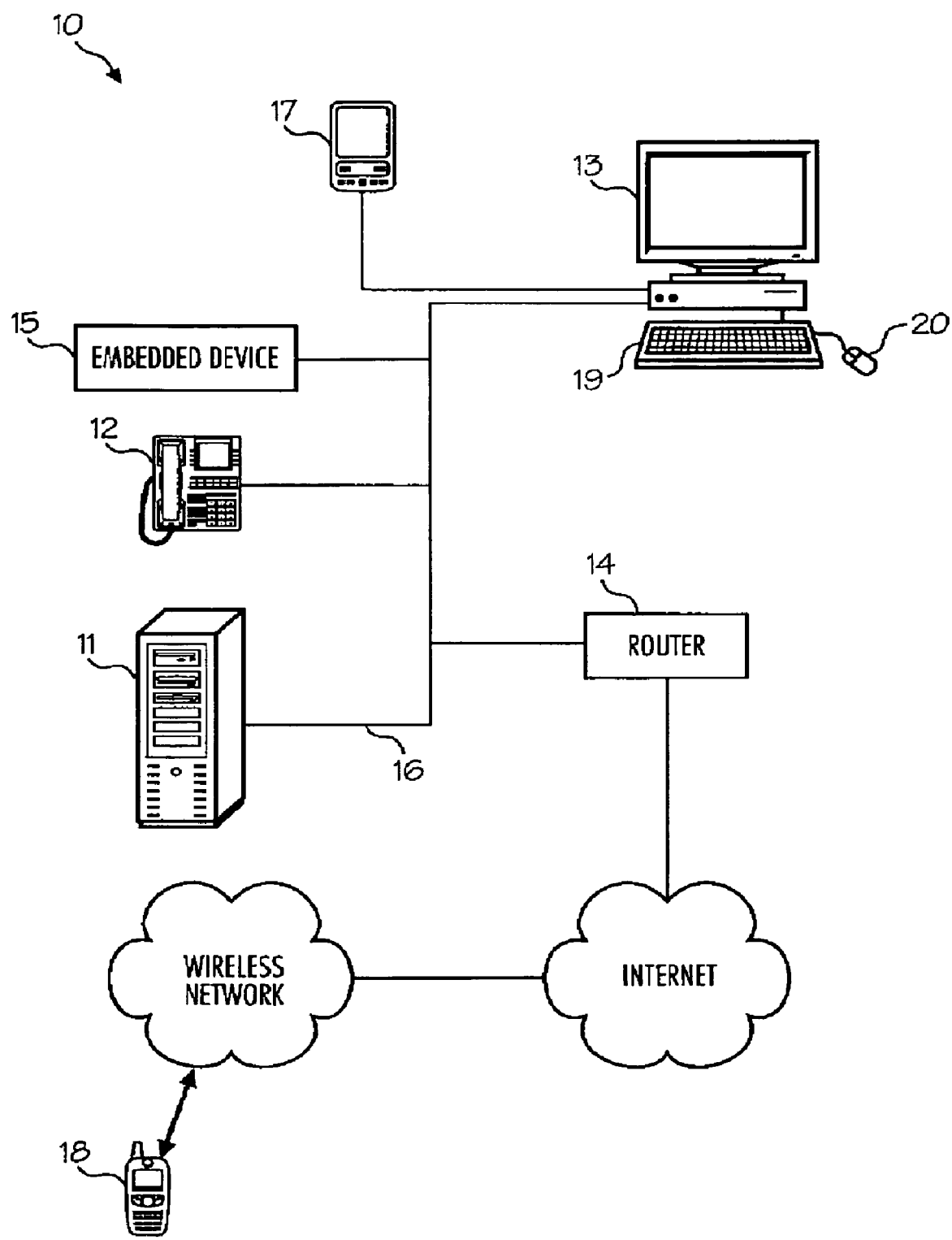
FIG. 1 is a block diagram of an exemplary network.

FIG. 1 is a block diagram of an exemplary communication network 10 having a call server 11, IP phone 12, PC 13, router 14 and another generic embedded device 15, all communicating over a LAN 16, in a well known manner. PC 13 includes a keyboard 19 and mouse interface 20. A PDA 17 is connected to PC 13 via cradle interface, Bluetooth or other suitable means.

Often, the communication system 10 will include additional IP phones and PCs although for ease of explanation only one PC 13 and IP phone 12 are illustrated. Moreover, any combination and numbers of embedded systems (IP phones, cell phones, etc.) is possible. Also, the network shown is wired but can be a wireless network or a mix of wired and wireless networks. For example, the network 10 is shown communicating with the Internet via a router 14 that, in turn, communicates with a wireless or cellular phone 18 via a wireless network.

Figure 2:
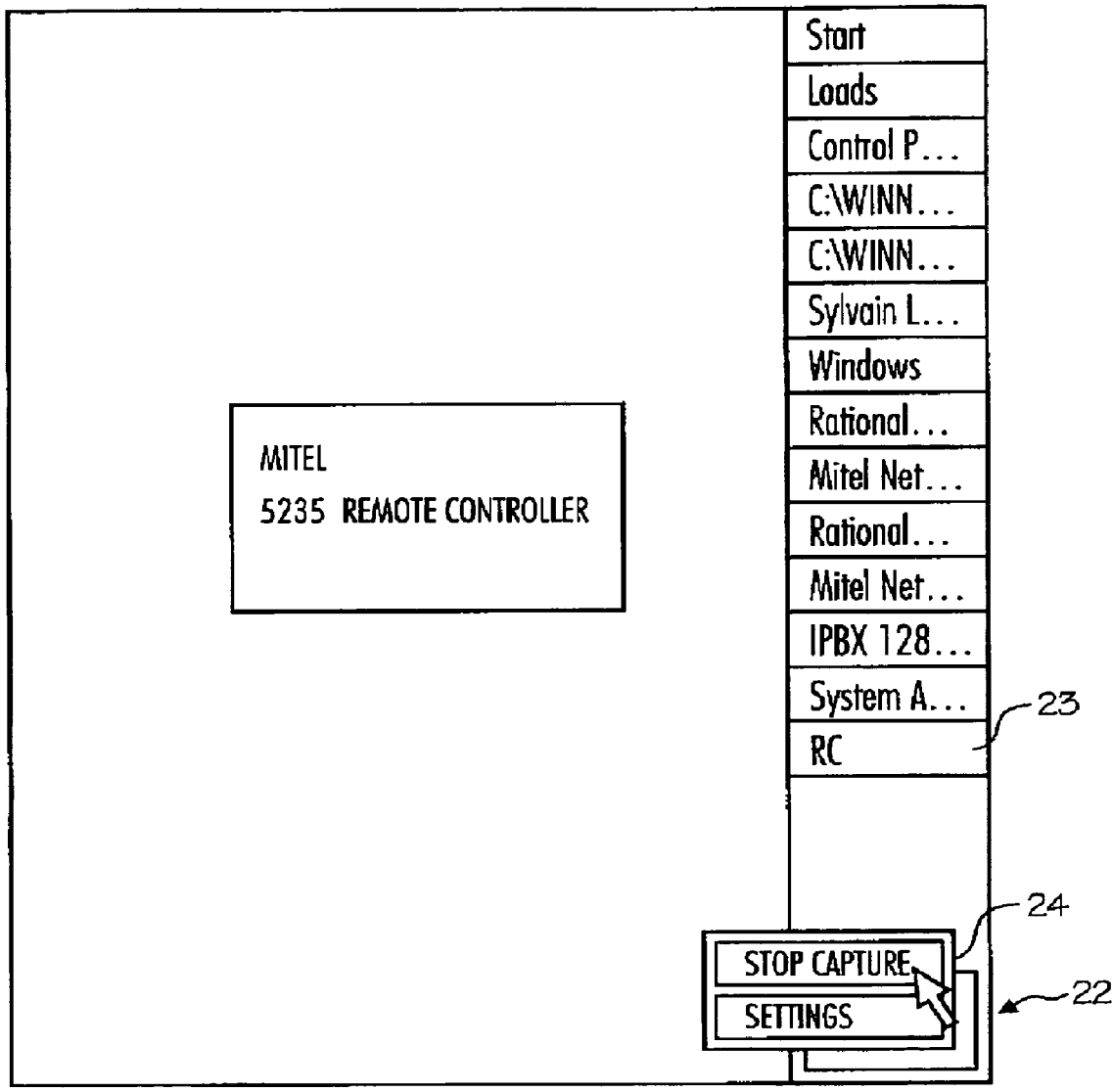
FIG. 2 is a screen shot of a computer system for implementing a method for routing user inputs, according to an exemplary embodiment.

Turning to FIG. 2, a screen shot is depicted of a display of PC 13 running a software application using a conventional operating system (e.g. Windows, Unix, MacOS, etc.). In operation, a user programs one or more hotkeys (e.g. Ctrl-C) on keyboard 19 which, according to the method illustrated in FIG. 3, maps the keyboard 19 and mouse 20 user inputs to one or multiple embedded systems, such as IP phone 12, embedded device 15 or PDA 17. Once the programmed hotkey is pressed, the PC software application routes the keyboard and mouse inputs to the mapped embedded system(s) via LAN 16.

In contrast with prior art systems, the actual keyboard and mouse inputs are transmitted via the LAN 16, rather than command functionality to be invoked by the application. These keyboard and mouse inputs are contextual to the application running on the mapped embedded system and are interpreted by it.

Figure 3:
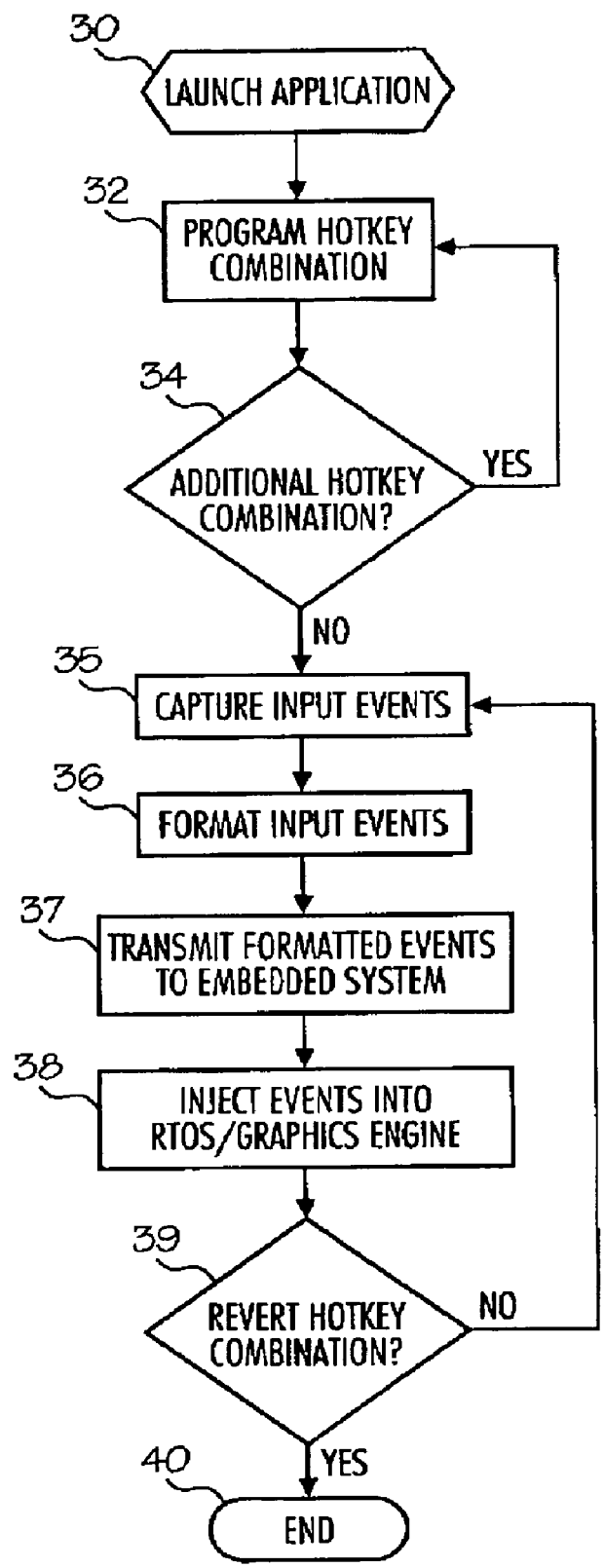
FIG. 3 is a flowchart showing a method for routing user inputs, according to an exemplary embodiment.

With combined reference to FIGS. 2 and 3, steps are depicted of an exemplary method for routing user inputs. At step 30, an application is launched on PC 13, by right-clicking on an icon in a Windows system tray 22, as depicted in the screen shot illustrated in FIG. 2, in response to which a contextual menu 24 presents the user with a series of choices. For example, the contextual menu can be used to invoke a GUI dialog (a settings sub-menu in the screenshot) for configuring hotkeys, as discussed in greater detail below with reference to FIG. 4. Upon launching the application, an icon 23 appears on the computer screen of PC 13 representing the active application.

Figure 4:
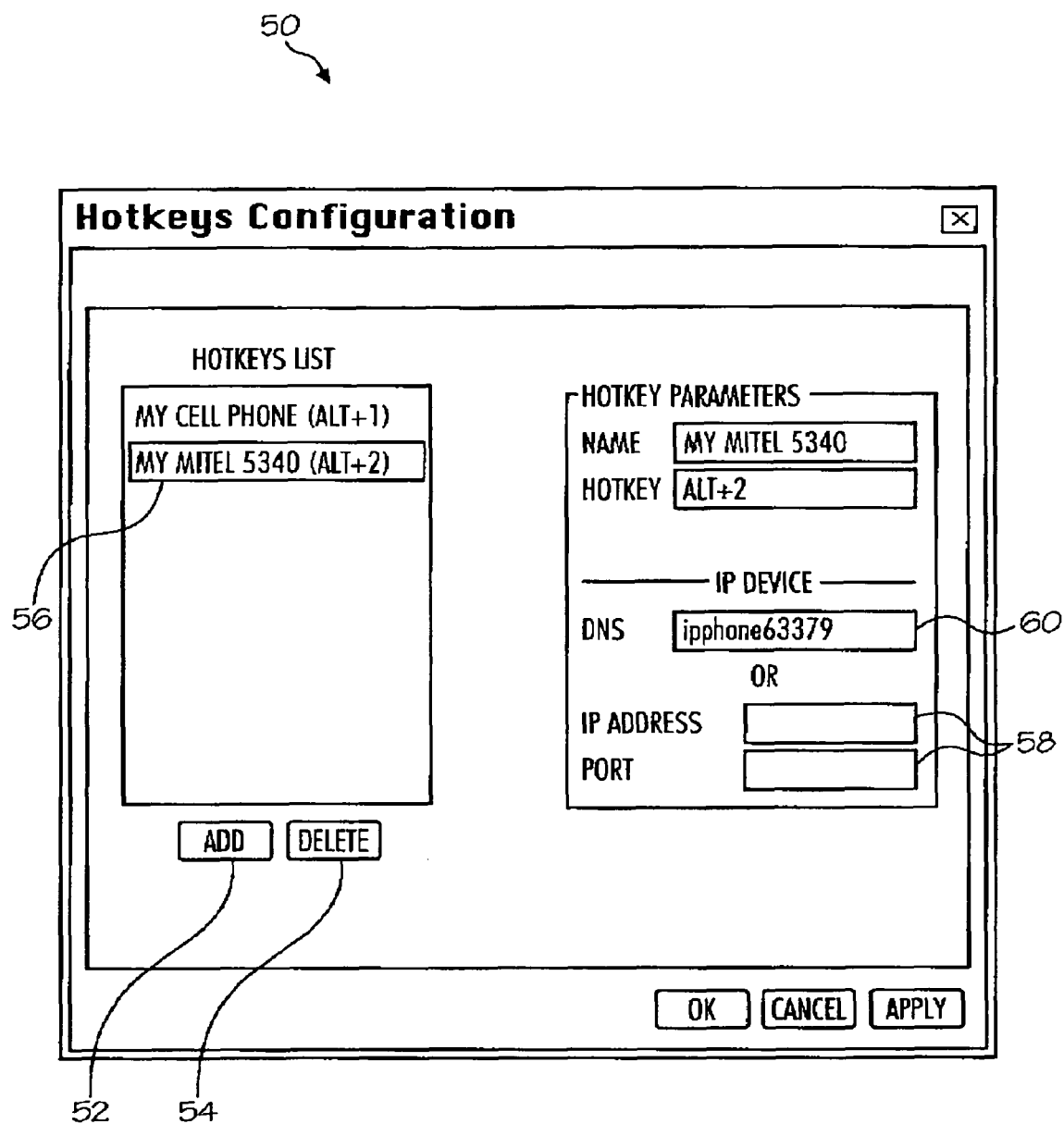
FIG. 4 is a screen shot of a GUI dialog for adding and deleting keyboard hotkeys to initiate routing of user inputs according to the method of FIG. 3.

Preferably, the application is implemented as a DLL, but can also be implemented as a standalone application. At step 32, a keyboard hotkey combination (e.g. Alt+~) is programmed by the user to map inputs from the PC keyboard 19 and mouse 20 to a connected embedded device such as, for example, IP phone 12 or embedded device 15, etc. Additional hotkey combinations may then be configured (step 34) for further embedded systems. Thereafter, keyboard 19 and mouse 20 events are captured (step 35). As indicated briefly above, FIG. 4 shows a graphical user interface (GUI) dialog box 50 for configuring hotkeys. The GUI presents the user with buttons 52 and 54 for adding new hotkeys and deleting existing hotkeys, respectively. The GUI also displays a list 56 of existing hotkeys. Adding a new hotkey creates a blank entry in the list for the user to configure. In order to configure a hotkey, the user selects a hotkey in the list 56 and identifies the appropriate IP address/port in field 58, or DNS name in field 60 (e.g. IpPhone63379). Capturing the DNS of a device is preferred to capturing the IP address since device IP addresses may be transient (e.g. the IP address of a device may change at any time based on network rules whereas DNS names are static). Optionally, the GUI dialog box 50 may also include an authentication field for entering a password for connecting to the embedded device.

The input events are then optionally formatted (step 36) and transported over the LAN 16 to the selected embedded system (step 37), using IP addresses, or URL, or other addressing methodology. More particularly, since keyboard input events are UNICODE characters, they are passed to the embedded device without any formatting. Mouse events, on the other hand, require translation or formatting. For instance, a left-button click is represented by different values depending on what operating system is being used (e.g. Windows defines a mouse click differently than Unix). Thus, a Windows mouse left-button click is translated into a well known value defined in the transport protocol between the Windows operating system and the embedded device (i.e. the protocol on the transport layer of the OSI model). The embedded device then further translates the received value to the value required by its operating system or graphical engine, in a well known manner. Encryption may also be used when transporting the input events across the network (e.g. Open SSL communication over a secure socket).

In one embodiment, a client-server session is established between the PC (client) and embedded system (server) using OpenSSL, according to the following pseudo-code:

```
Server side (embedded system)
    Create OpenSSL Socket
    Wait For A Connection Request
    Accept Connection Request
    REPEAT until connection is terminated by client
        Receive packet
        Extract input event
        IF necessary, translate input event
        Inject input event into RTOS/GraphicEngine
Client side (PC)
    Create OpenSSL Socket
    Connect to server
    When connection authenticated
    REPEAT until end user exits remote control of an embedded system
        Wait for any PC input
        IF necessary, translate input event to communication protocol type
        Transmit packet
```

From the foregoing, it will be appreciated that input events on the LAN 16 are received by the embedded device, which functions as a driver for injecting the input events into an RTOS/Graphic engine of the embedded system (step 38). As indicated above, the embedded device operates as a server, listening for connection requests from the PC. More particularly, a software component within the embedded device (server) runs as a driver for accessing the operating system and/or graphic engine of the device. Once the server receives and authenticates a request from the PC (using Open SSL, password, etc.), it starts receiving input events, translates them if necessary (e.g. left-button clicks) and injects them into the RTOS/Graphic engine of the embedded system, which in turn translates the input events for calling the appropriate API (function calls) of the RTOS/Graphic engine.

Thereafter, the embedded system responds directly to the user inputs from PC 13 to navigate from field to field, capture data or copy/paste information from PC 13 to the phone 12. If a predetermined further key (e.g. Esc) is pressed (step 39), or the user executes a mouse right-click and selects the "Stop Capture" option identified by reference 24 in FIG. 2, the user's mouse and keyboard revert to controlling PC 13 (step 40).

A person of ordinary skill in the art will appreciate that the method of FIG. 3 is not limited to controlling IP phone 12, but may be applied to any embedded system or device 15, PDA 17, cellular telephone 18, etc.

The many features and advantages of the method set forth herein will be apparent from the detailed specification and, thus, it is intended by the appended claims to cover all such features and advantages. Most PC input devices currently use Bluetooth, USB and PS2 connectivity. Keyboards with IP connectivity may be interfaced directly to embedded systems via an appropriate IP broadcast service server, such as network printers. The method set forth herein is applicable to any embedded systems where the form factor limits the choice of man-machine interfaces, including connectors such as USB and PS2. Further, since numerous modifications and changes will readily occur to those skilled in the art, it is not desired to limit the claims to the exact construction and operation illustrated and described, and accordingly all suitable modifications and equivalents may be resorted to, falling within the scope of the claims.

What is claimed is:

1. A method for routing user inputs from a PC, having a keyboard and a mouse, to at least one embedded system over a network, comprising:
   creating a communication session between said PC and said at least one embedded system according to a predetermined transport protocol, wherein said PC sends a connection request to said embedded system and said embedded system listens for and accepts said request;
   capturing user interface input events from said keyboard and said mouse;
   translating said mouse input events to a value known by said predetermined transport protocol;
   transmitting said mouse and said keyboard input events over said network from said PC to said at least one embedded system according to said predetermined transport protocol;
   injecting said user interface input events into one of either an operating system or RTOS/Graphic engine of said at least one embedded system; and
   translating said mouse input events at said embedded system prior to injecting into one of either said operating system or RTOS/Graphic engine of said embedded system,
   wherein said request and said session occur after both said PC and said embedded system are powered-on without the need to reset.

2. The method of claim 1, wherein said user interface input events are encrypted for transmission over said network.

3. The method of claim 1, further comprising configuring at least one hotkey combination for initiating creation of said communication session between said PC and said at least one embedded system.

4. The method of claim 3, wherein said at least one hotkey combination is mapped to said at least one embedded system via an IP address and port.

5. The method of claim 1, wherein said at feast one embedded system is an IP phone.

6. The method of claim 1, wherein said at least one embedded system is a personal digital assistant.

7. The method of claim 1, wherein said at least one embedded system is cellular phone.

8. The method of claim 1, wherein said network is a local area network.

9. The method of claim 1, wherein said wherein said network is the Internet.

10. The method of claim 1, wherein said network is a wireless network.

11. The method of claim 3, wherein said at least one hotkey combination is mapped to said at least one embedded system via a DNS name.

12. The method of claim 1, wherein said PC is authenticated by said at least one embedded system prior to creating said communication session.

* * * * *